(12) United States Patent
Kamand et al.

(10) Patent No.: US 11,544,199 B2
(45) Date of Patent: Jan. 3, 2023

(54) MULTI-WAY CACHE MEMORY ACCESS

(71) Applicant: SHENZHEN GOODIX TECHNOLOGY CO., LTD., Shenzhen (CN)

(72) Inventors: Bassam S. Kamand, San Diego, CA (US); Waleed Younis, San Diego, CA (US); Ramon Zuniga, San Diego, CA (US); Jagadish Rongali, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/499,834

(22) Filed: Oct. 12, 2021

(65) Prior Publication Data
US 2022/0066942 A1 Mar. 3, 2022

Related U.S. Application Data

(63) Continuation of application No. 16/817,609, filed on Mar. 13, 2020.

(51) Int. Cl.
*G06F 12/00* (2006.01)
*G06F 12/0895* (2016.01)
(Continued)

(52) U.S. Cl.
CPC ...... *G06F 12/0895* (2013.01); *G06F 9/30087* (2013.01); *G06F 12/084* (2013.01); *G06F 12/0853* (2013.01); *G06F 13/1689* (2013.01)

(58) Field of Classification Search
CPC ............... G06F 12/0895; G06F 12/084; G06F 9/30087; G06F 12/1689; G06F 12/0853
See application file for complete search history.

(56) References Cited

U.S. PATENT DOCUMENTS

| 6,449,693 B1 | 9/2002 | Goetz et al. |
| 2001/0029573 A1 | 10/2001 | Johnson |

(Continued)

OTHER PUBLICATIONS

CATT, "Remaining issues on NR HARQ timing", 3GPP TSG RAN WG1 Meeting #92bis, Sanya, China, Apr. 16-20, 2018, total 7 pages, R1-1803758.

(Continued)

*Primary Examiner* — Arvind Talukdar
(74) *Attorney, Agent, or Firm* — Kilpatrick Townsend & Stockton LLP

(57) ABSTRACT

A cache memory is disclosed. The cache memory includes an instruction memory portion having a plurality of instruction memory locations configured to store instruction data encoding a plurality of CPU instructions. The cache memory also includes a tag memory portion having a plurality of tag memory locations configured to store tag data encoding a plurality of RAM memory address ranges the CPU instructions are stored in. The instruction memory portion includes a single memory circuit having an instruction memory array and a plurality of instruction peripheral circuits communicatively connected with the instruction memory array. The tag memory portion includes a plurality of tag memory circuits, where each of the tag memory circuits includes a tag memory array, and a plurality of tag peripheral circuits communicatively connected with the tag memory array.

20 Claims, 5 Drawing Sheets

(51) Int. Cl.
*G06F 12/084* (2016.01)
*G06F 9/30* (2018.01)
*G06F 13/16* (2006.01)
*G06F 12/0853* (2016.01)

(56) References Cited

U.S. PATENT DOCUMENTS

2010/0017567 A1  1/2010  Fujisawa
2013/0036271 A1* 2/2013  Krishna ............... G06F 12/08
                                            711/135

OTHER PUBLICATIONS

MediaTek Inc., "Evaluations and enhancements of NR control channels for URLLC Document for: Discussion and Decision", 3GPP TSG RAN WG1 Meeting #94bis, Chengdu, China, Oct. 8-12, 2018, total 10 pages, R1-1810463.

* cited by examiner

| | Area (mm²) | Power (mW) |
|---|---|---|
| CONVENTIONAL | 0.39 | 2.059 |
| NEW | 0.19 | 0.57 |
| IMPROVEMENT | 51% | 72% |

MULTI-WAY CACHE MEMORY ACCESS

CROSS-REFERENCES TO RELATED APPLICATIONS

This application is a continuation of U.S. patent application Ser. No. 16/817,609, for "MULTI-WAY CACHE MEMORY ACCESS", filed on Mar. 13, 2020, which is hereby incorporated by references in its entirety.

FIELD OF THE INVENTION

The present application generally pertains to generating cache memory, and more particularly to cache memory architectures which use low area.

BACKGROUND OF THE INVENTION

Cache memories are used in computer systems to reduce instruction access time for frequently used instructions. Central Processing Unit (CPU) executable instructions are stored in RAM, and are available for access by the CPU, as needed. Some, but not all, instructions, for example recently used instructions, are additionally stored in the cache memory. Because the cache memory is faster than RAM, the cache memory is preferred, and is used if the instruction needed by the CPU is stored therein. If the instruction needed by the CPU is not stored in the cache memory, the instruction is retrieved from the RAM.

Conventional cache memories require large amounts of die area to implement. Improved cache memories requiring less area are needed in the art.

BRIEF SUMMARY OF THE INVENTION

One inventive aspect is a cache memory. The cache memory includes an instruction memory portion having a plurality of instruction memory locations configured to store instruction data encoding a plurality of CPU instructions. The cache memory also includes a tag memory portion having a plurality of tag memory locations configured to store tag data encoding a plurality of RAM memory address ranges the CPU instructions are stored in. The instruction memory portion includes a single memory circuit having an instruction memory array and a plurality of instruction peripheral circuits communicatively connected with the instruction memory array. The tag memory portion includes a plurality of tag memory circuits, where each of the tag memory circuits includes a tag memory array, and a plurality of tag peripheral circuits communicatively connected with the tag memory array.

Another inventive aspect is a computer system. The computer system includes a CPU configured to execute CPU instructions, a RAM configured to store first representations of the CPU instructions, and a cache memory. The cache memory includes an instruction memory portion having a plurality of instruction memory locations configured to store instruction data encoding a plurality of CPU instructions. The cache memory also includes a tag memory portion having a plurality of tag memory locations configured to store tag data encoding a plurality of RAM memory address ranges the CPU instructions are stored in. The instruction memory portion includes a single memory circuit having an instruction memory array and a plurality of instruction peripheral circuits communicatively connected with the instruction memory array. The tag memory portion includes a plurality of tag memory circuits, where each of the tag memory circuits includes a tag memory array, and a plurality of tag peripheral circuits communicatively connected with the tag memory array.

DETAILED DESCRIPTION OF THE INVENTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1:
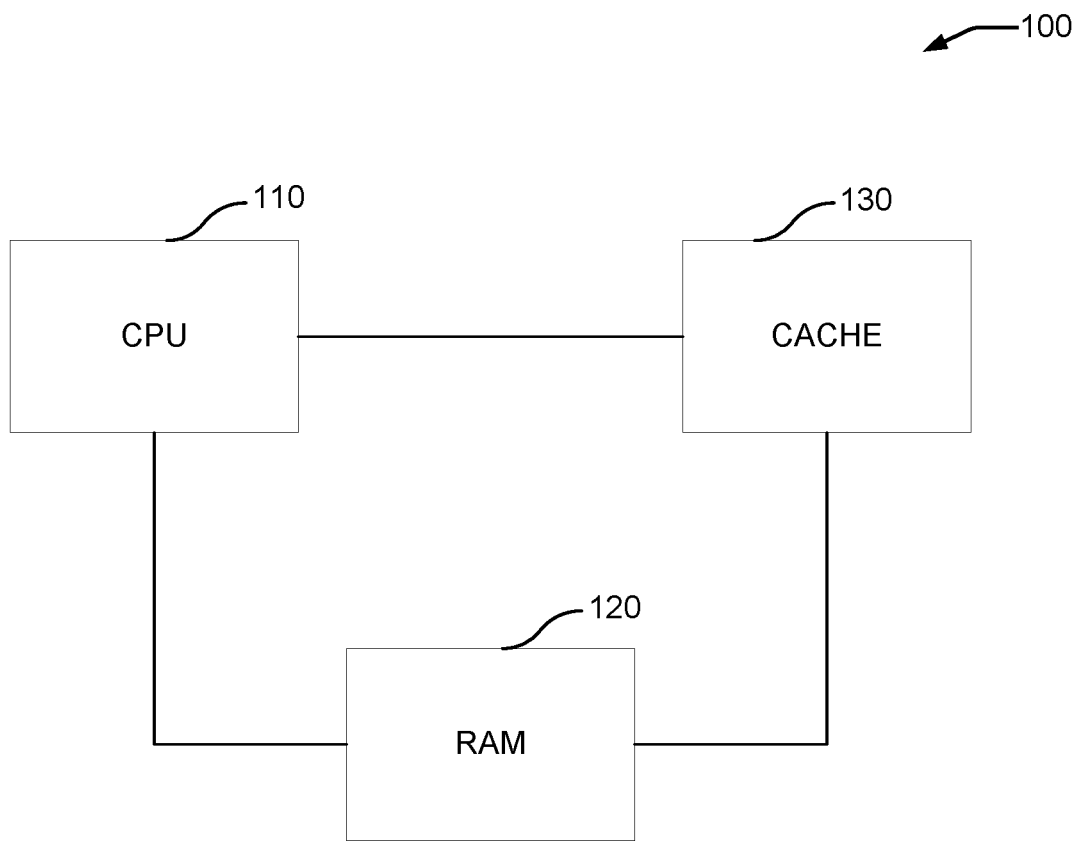
FIG. 1 is a schematic flowchart illustrating

FIG. 1 is a schematic illustration of a computer system 100. Computer system 100 includes CPU 110, random access memory (RAM) 120, and cache memory 130.

The information stored in a cache memory 130 includes instructions which the CPU 110 may need for executing a software application. The information stored in the cache memory 130 also includes information for each particular instruction identifying a portion or address range of the RAM 120 the particular instruction is stored in. The identifying information is called a tag. Other information may additionally be stored in the cache memory, as understood by those of skill in the art.

As understood by those of skill in the art, in computer systems, cache memories may be subdivided into multiple ways, where each way is independently written and read. To fetch an instruction from the cache memory, the CPU provides an address to the cache memory. The CPU address includes a tag portion and an index portion. In some embodiments, the CPU address may additionally include other information, such as an offset, as understood by those of skill in the art.

In a conventional cache memory, the index portion of the CPU address is used to read one instruction and its corresponding tag from each of the ways. Accordingly, a number of instructions corresponding to the number of ways, along with each of their corresponding tags, are read from the cache memory based on the index portion of the CPU address.

In the conventional cache memory, the tags associated with the instructions are each compared to the tag portion of the CPU address. If one of the tags matches the tag portion of the CPU address, the instruction corresponding with the matching tag is provided to the CPU as the instruction requested by the CPU. If none of the tags match the tag portion of the CPU address, the instruction requested by the CPU is not located in the cache memory, and must, instead, be retrieved from RAM.

Figure 2:
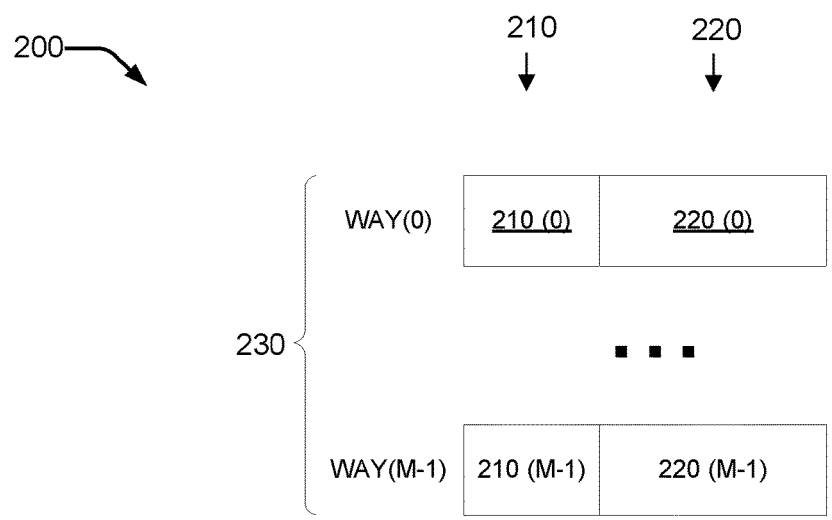
FIG. 2 is a schematic illustration of a cache memory according to some embodiments.

FIG. 2 is a schematic illustration of a cache memory 200 according to some embodiments. Cache memory 200 may be used in computer system 100 as cache memory 130. Cache memory 200 includes M ways 230, where each way includes a tag memory portion 210 and an instruction memory portion 220.

In some embodiments, the ways of cache memory 200 include one or more other memory portions, as understood by those of skill in the art. For example, in some embodiments, each way 230 includes a valid bit portion, where each bit in the valid bit portion indicates whether a particular instruction is valid, as understood by those of skill in the art.

Instruction memory portion 220 is written with data corresponding with CPU instructions. In addition, tag memory portion 210 is written with data corresponding with portions or address ranges of the RAM the instructions are stored in.

Instruction memory portion 220 is a single memory circuit, despite being abstractly or conceptually segmented into the M ways 230. Accordingly, instruction memory portion 220 includes an array of memory cells which receives signals from and provides signals to a number of peripheral circuits which are used to access the memory cells for writing and for reading instruction information. As understood by those of skill in the art, the peripheral circuits may include, for example, an address decoder, sense amplifiers, a column multiplexer, and output buffers. In some embodiments, the peripheral circuits may include one or more other circuits. The memory cells are each constituent to a particular one of the ways 230. The peripheral circuits, however, may each receive signals from or provide signals to memory cells of all of the ways 230.

Tag memory portion 210 includes a single memory circuit for each of the ways 230. Accordingly each way 230 includes an array of memory cells which receives signals from and provides signals to a number of peripheral circuits which are used to access the memory cells for writing and for reading tag information. As understood by those of skill in the art, the peripheral circuits may include, for example, an address decoder, sense amplifiers, a column multiplexer, and output buffers. In some embodiments, the peripheral circuits may include one or more other circuits. The memory cells and the peripheral circuits are each constituent to a particular one of the ways 230.

Cache memory 200 is structured so that, to fetch an instruction therefrom, the CPU (e.g. CPU 110) provides an address to the cache memory 200. The CPU address includes a tag portion and an index portion. In some embodiments, the CPU address may additionally include other information, such as an offset, as understood by those of skill in the art.

The index portion of the CPU address identifies a memory location in each of the tag memory portions 210(0) to 210(M-1) of the M ways 230. The M tag memory portions 210(0) to 210(M-1) are each associated with a memory location in a corresponding one of the instruction memory portions 220(0) to 220(M-1) of the M ways 230. The association of the M tag memory portions 210(0) to 210(M-1) and the instruction memory portions 220(0) to 220(M-1) of the M ways is instantiated in hardware at least by each of the M tag memory portions 210(0) to 210(M-1) and its associated instruction memory portion 220(0) to 220(M-1) having an address partially or wholly identified by the index portion of the CPU address.

The M tag memory portions 210(0) to 210(M-1) identified by the index portion of the CPU address are read to retrieve M tags. The M tags are each compared with the tag portion of the CPU address. If one of the M tags matches the tag portion of the CPU address, the way 230 having the matching tag is identified. If none of the tags matches the tag portion of the CPU address, the instruction requested by the CPU is not located in the cache memory, and must be retrieved from RAM.

The index portion of the CPU address is then used to read an instruction from the instruction memory portion $220(x)$ of the identified way 230. The instruction read from the instruction memory portion $220(x)$ of the identified way 230 is returned to the CPU as the instruction requested by the CPU.

Figure 3:
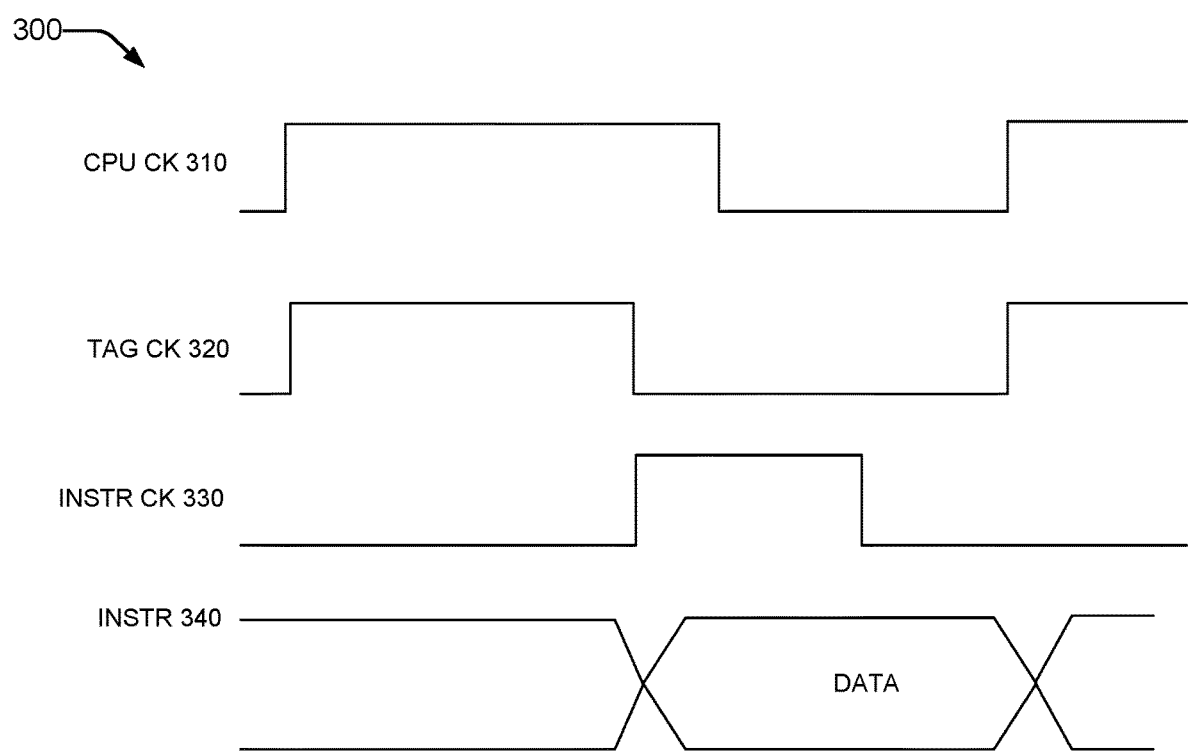
FIG. 3 illustrates a timing diagram schematically illustrating certain timing relationships for various operations of a cache memory.

FIG. 3 illustrates a timing diagram 300 schematically illustrating certain timing relationships for various operations of cache memory 200. Timing diagram 300 illustrates CPU clock waveform 310, tag clock waveform 320, instruction clock waveform 330, and instruction waveform 340. The illustrated waveforms correspond with clocks generated by clock generation circuits understood by those of skill in the art.

CPU clock waveform 310 illustrates a representation of a CPU clock used by the CPU 110. As understood by those of skill in the art, the CPU clock represented by CPU clock waveform 310 may be used by CPU 110, for example, to receive input data, to execute instructions, and to generate output data. CPU 110 may use the CPU clock represented by CPU clock waveform 310 to additionally perform other operations. CPU 110 may use additional clocks (not shown).

Tag clock waveform 320 illustrates a representation of a tag clock used by tag memory portion 210. The tag clock represented by tag clock waveform 320 may be used by tag memory portion 210, for example, for writing and reading tag data to and from tag memory portion 210.

Instruction clock waveform 330 illustrates a representation of an instruction clock used by instruction memory portion 220. The instruction clock represented by instruction clock waveform 330 may be used by instruction memory portion 220, for example, for writing and reading instruction data to and from instruction memory portion 220.

Instruction waveform 340 illustrates a representation of instruction data. The instruction data encodes instructions which are executable by CPU 110, and which are provided to CPU 110 by cache memory 200, for example, for execution by CPU 110.

As illustrated in FIG. 3, during a first portion of a CPU clock period, the tag clock is active (high). While the tag clock is active, the M tag memory portions 210(0) to 210(M-1) identified by the index portion of the CPU address are read to retrieve M tags. In addition, while the tag clock is active, the M tags are each compared with the tag portion of the CPU address. If one of the M tags matches the tag portion of the CPU address, the way 230 having the matching tag is identified.

During a second, subsequent, portion of the CPU clock period, the instruction clock is active (high). During the second portion of the CPU clock period, the index portion of the CPU address is used to perform a read operation on the instruction memory portion 220(x) of the identified way 230 to read an instruction therefrom. Once read, the instruction read from the instruction memory portion 220(x) of the identified way 230 is returned to the CPU 110 as the instruction requested by the CPU 110.

Timing diagram 300 schematically illustrates an embodiment of certain timing relationships for CPU clock waveform 310, tag clock waveform 320, instruction clock waveform 330, and instruction waveform 340. Alternative timing relationships may alternatively be used. For example, the phase relationship between CPU clock waveform 310 and either or both of tag clock waveform 320 and instruction clock waveform 330 may be modified. Additionally or alternatively, in some embodiments, the active states of either or both of tag clock waveform 320 and instruction clock waveform 330 are low.

Figure 4:
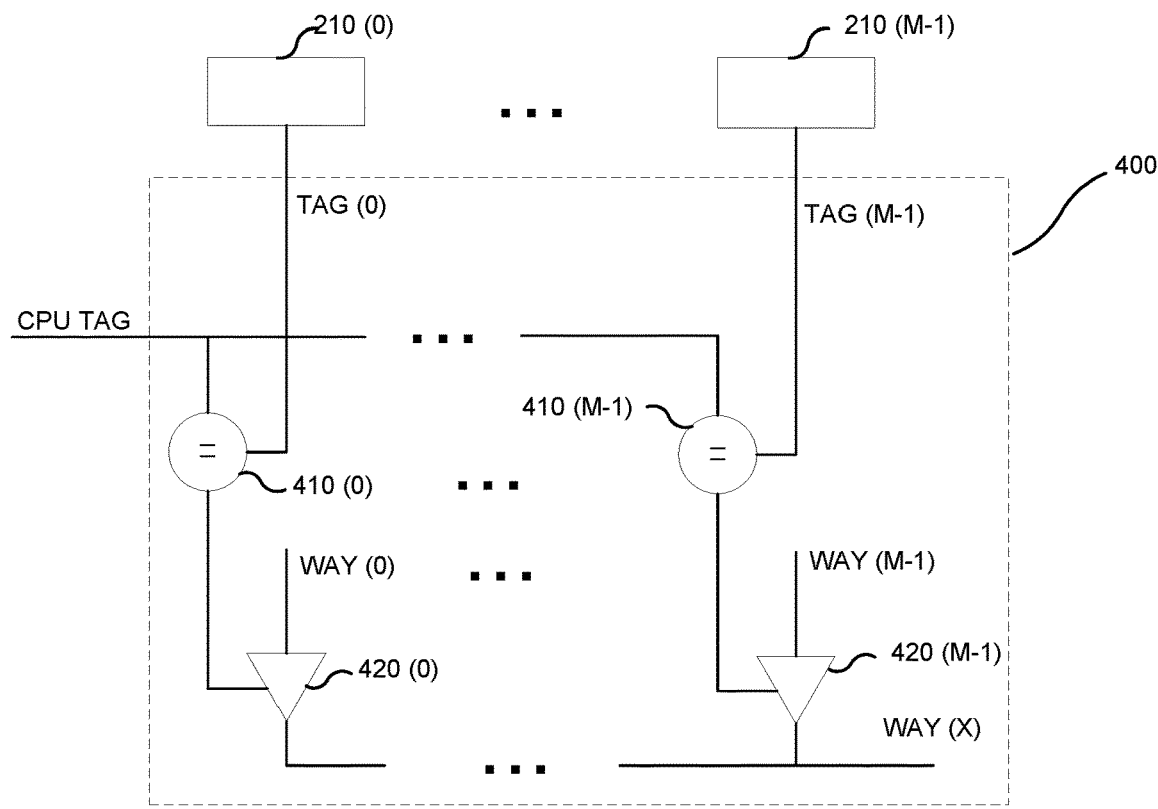
FIG. 4 is a schematic illustration of a comparison circuit, which is configured to identify which of the M ways has the instruction requested by a CPU.

FIG. 4 is a schematic illustration of a comparison circuit 400, which is configured to identify which of the M ways 230 has the instruction requested by the CPU 110. Comparison circuit 400 includes tag comparators 410(0) to 410(M-1) and tri-state driver arrays 420(0) to 420(M-1). In some embodiments, alternative comparison circuits are used.

As illustrated, comparison circuit 400 receives the tag portion of the CPU address at bus CPU TAG. In addition, comparison circuit receives M tags at tag busses TAG(0) to TAG(M-1). Each of the M tags is generated as the result of reading one of the tag memory portions 210(0) to 210(M-1) of the M ways 230.

Each of tag comparators 410(0) to 410(M-1) is configured to compare one of the M tags with the tag portion of the CPU address at bus CPU TAG. At most one of the M tags matches the tag portion of the CPU address.

Tri-state driver arrays 420(0) to 420(M-1) each have data inputs which receive data identifying one of the M ways 230. The data inputs of each of the tri-state driver arrays 420(0) to 420(M-1) are connected to one of the way identification busses WAY(0) to WAY(M-1). In addition, tri-state driver arrays 420(0) to 420(M-1) each receive an indication of whether a particular one of the M tags at tag busses TAG(0) to TAG(M-1) matches the tag portion of the CPU address at bus CPU TAG.

The tri-state driver arrays receiving indications that the particular one of the M tags associated therewith does not match the tag portion of the CPU address at bus CPU TAG have outputs which are tri-stated, and are high impedance. The tri-state driver receiving the indication that the particular one of the M tags associated therewith does match the tag portion of the CPU address at bus CPU TAG, outputs data at way bus WAY(X) indicating the particular way 230 identified at its data input.

Accordingly, the tri-state driver arrays 420(0) to 420(M-1) perform a multiplexing function which passes data identifying the particular way 230 having tag data matching the tag portion of the CPU address. As understood by those of skill in the art, alternative circuits performing the multiplexing function may alternatively be used.

Figure 5:
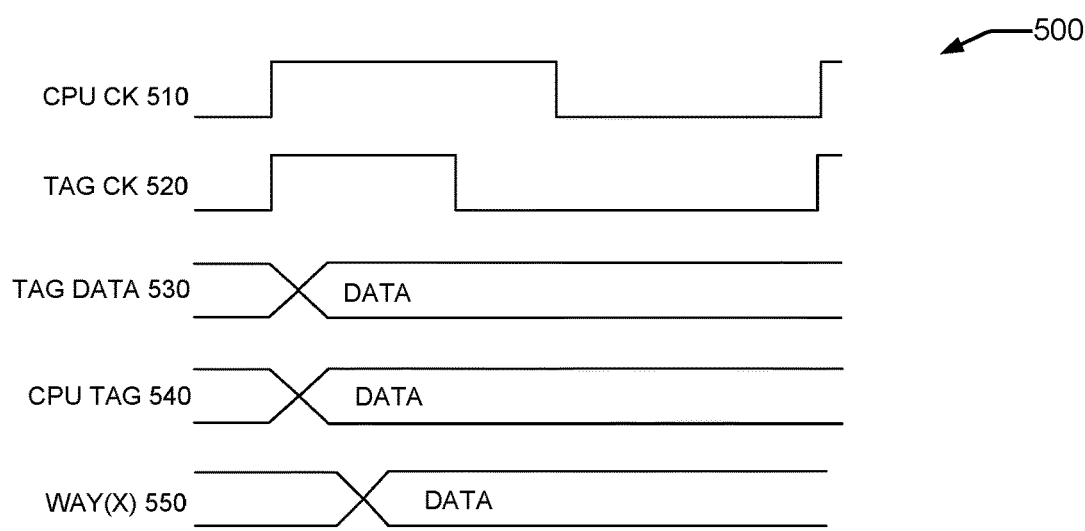
FIG. 5 illustrates a timing diagram schematically illustrating certain timing relationships for various operations of a cache memory and a comparison circuit.

FIG. 5 illustrates a timing diagram 500 schematically illustrating certain timing relationships for various operations of cache memory 200 and comparison circuit 400. Timing diagram 500 illustrates CPU clock waveform 510, tag clock waveform 520, tag data waveform 530, CPU tag data waveform 540, and way bus data waveform 550.

CPU clock waveform 510 illustrates a representation of a CPU clock used by the CPU 110, and has characteristics similar or identical to CPU clock waveform 310 of FIG. 3.

Tag clock waveform 520 illustrates a representation of a tag clock used by tag memory portion 210, and has characteristics similar or identical to tag clock waveform 320 of FIG. 3.

Tag data waveform 530 illustrates a representation of tag data identifying the M tags at tag busses TAG(0) to TAG(M-1).

CPU tag data waveform 540 illustrates a representation of the tag portion of the CPU address at bus CPU TAG.

Way bus data waveform 550 illustrates a representation of way identification data at way bus WAY(X).

During a first portion of a CPU clock period, the tag clock is active (high). In response to the tag clock being active, the M tag memory portions 210(0) to 210(M-1) identified by the index portion of the CPU address are read to retrieve M tags. The M tags are respectively represented by data at tag busses TAG(0) to TAG(M-1). In addition, while the tag clock is active, the M tags are each compared with the tag portion of the CPU address by comparators 410(0) to 410(M-1).

Furthermore, while the tag clock is active, tri-state driver arrays 420(0) to 420(M-1) each receive data identifying one of the M ways 230 from the way identification busses WAY(0) to WAY(M-1). In addition, tri-state driver arrays 420(0) to 420(M-1) each receive an indication from a corresponding comparator 410 indicating whether a particular one of the M tags at tag busses TAG(0) to TAG(M-1) matches the tag portion of the CPU address at bus CPU TAG.

In addition, while the tag clock is active, the tri-state driver array receiving the indication that the particular one of the M tags associated therewith matches the tag portion of the CPU address at bus CPU TAG, outputs way identification data at way bus WAY(X) identifying the particular way 230 identified at its data input.

Timing diagram 500 schematically illustrates an embodiment of certain timing relationships for CPU clock waveform 510, tag clock waveform 520, tag data waveform 530, CPU tag data waveform 540, and way bus data waveform 550. Alternative timing relationships may alternatively be used. For example, the phase relationship between CPU clock waveform 510 and tag clock waveform 520 may be modified. Additionally or alternatively, in some embodiments, the active state of tag clock waveform 520 is low.

Figure 6:
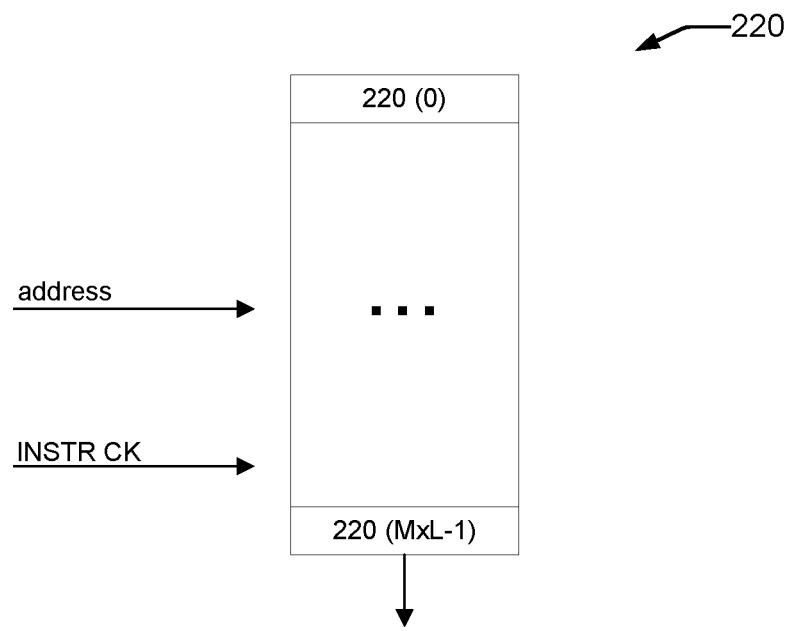
FIG. 6 is a schematic illustration of an instruction memory portion of a cache memory according to some embodiments.

FIG. 6 is a schematic illustration of an instruction memory portion 220 of a cache memory 200 according to some embodiments. Instruction memory portion 220 includes memory locations for instructions stored in all of the ways 230 of cache memory 200. Accordingly, instruction memory portion 220 stores instructions in memory locations 220(0) to 220(M*L-1), where M is equal to the number of ways 230, and L is equal to the length (number of instruction memory locations) in each way 230.

As illustrated, instruction memory portion 220 receives an address. Instruction memory portion 220 is configured to be read so as to output the instruction stored in the memory location associated with the received address.

The received address includes a tag portion and an index portion.

The tag portion is generated by comparison circuit 400 and is the formed by the way data at way bus WAY(X) indicating the particular way 230 identified as having tag data matching the tag portion of the CPU address.

The index portion of the received address is formed by the index portion of the CPU address.

Figure 7:
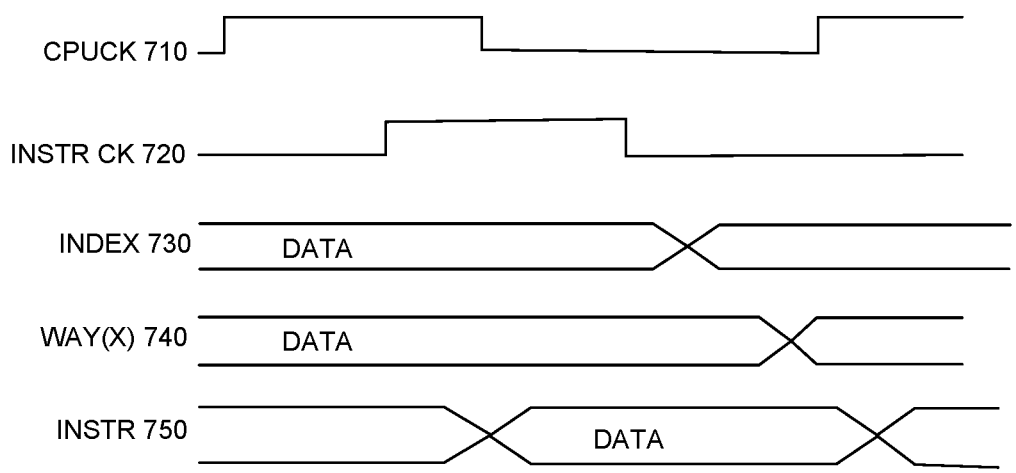
FIG. 7 illustrates a timing diagram schematically illustrating certain timing relationships for various operations instruction of a memory portion of a cache memory.

FIG. 7 illustrates a timing diagram 700 schematically illustrating certain timing relationships for various operations instruction memory portion 220 of cache memory 200. Timing diagram 700 illustrates CPU clock waveform 710, instruction clock waveform 720, index data waveform 730, way data waveform 740, and instruction data waveform 750.

CPU clock waveform 710 illustrates a representation of a CPU clock used by the CPU 110, and has characteristics similar or identical to CPU clock waveform 310 of FIG. 3.

Instruction clock waveform 720 illustrates a representation of an instruction clock used by instruction memory portion 220, and has characteristics similar or identical to instruction clock waveform 320 of FIG. 3.

Index data waveform 730 illustrates a representation of the index portion of the CPU address at bus CPU TAG.

Way data waveform 740 illustrates a representation of way identification data at way bus WAY(X).

Instruction data waveform 750 illustrates a representation of the instruction read from instruction memory portion 220.

During a second portion of the CPU clock period, subsequent to the first portion of the CPU clock period discussed with reference to FIG. 5, the instruction clock is active (high). In response to the instruction clock being active, the way identification data and the index portion of the CPU address are used to read an instruction from the instruction memory portion 220. Once read, the instruction read from the instruction memory portion 220 is returned to the CPU 110 as the instruction requested by the CPU 110.

Timing diagram 700 schematically illustrates an embodiment of certain timing relationships for CPU clock waveform 710, instruction clock waveform 720, index data waveform 730, way data waveform 740, and instruction data waveform 750. Alternative timing relationships may alternatively be used. For example, the phase relationship between CPU clock waveform 710 and instruction clock waveform 720 may be modified. Additionally or alternatively, in some embodiments, the active state of instruction clock waveform 720 is low.

Figures 8, 9:
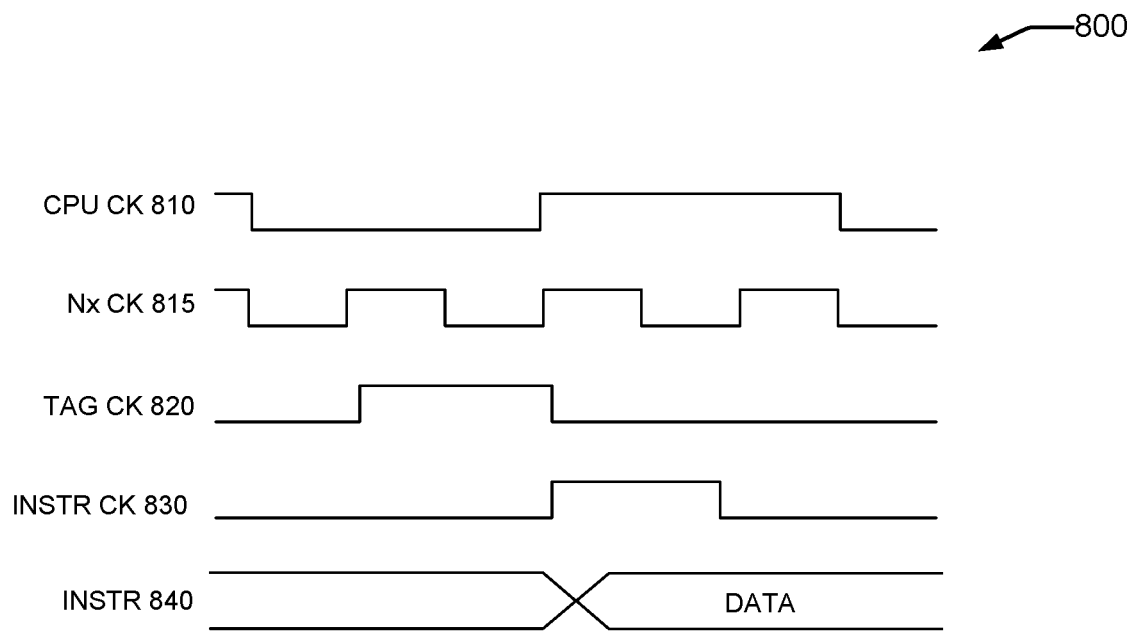
FIG. 8 illustrates a timing diagram schematically illustrating another embodiment of certain timing relationships for various operations of a cache memory.
FIG. 9 is a chart illustrating cache memory area and power improvement achieved using an embodiment of a cache memory using inventive aspects discussed herein as compared with a traditional cache memory.

FIG. 8 illustrates a timing diagram 800 schematically illustrating another embodiment of certain timing relationships for various operations of cache memory 200. Timing diagram 800 illustrates CPU clock waveform 810, NxCPU clock waveform 815, tag clock waveform 820, instruction clock waveform 830, and instruction waveform 840. The illustrated waveforms correspond with clocks generated by clock generation circuits understood by those of skill in the art.

CPU clock waveform 810 illustrates a representation of a CPU clock used by the CPU 110. As understood by those of skill in the art, the CPU clock represented by CPU clock waveform 810 may be used by CPU 110, for example, to receive input data, to execute instructions, and to generate output data. CPU 110 may use the CPU clock represented by CPU clock waveform 810 to additionally perform other operations. CPU 110 may use additional clocks (not shown).

NxCPU clock waveform 815 illustrates a representation of a clock which has a frequency which is a multiple of the frequency of the CPU clock. In this embodiment, the frequency of the clock of NxCPU clock waveform 815 has a frequency which is three times the frequency of the CPU clock. The clock of NxCPU clock waveform 815 may be generated based on the CPU clock using circuits known to those of skill in the art.

Tag clock waveform 820 illustrates a representation of a tag clock used by tag memory portion 210. The tag clock represented by tag clock waveform 820 may be used by tag memory portion 210, for example, for writing and reading tag data to and from tag memory portion 210.

Instruction clock waveform 830 illustrates a representation of an instruction clock used by instruction memory portion 220. The instruction clock represented by instruction clock waveform 830 may be used by instruction memory portion 220, for example, for writing and reading instruction data to and from instruction memory portion 220.

Instruction waveform 840 illustrates a representation of instruction data. The instruction data encodes instructions which are executable by CPU 110, and which are provided to CPU 110 by cache memory 200, for example, for execution by CPU 110.

As illustrated in FIG. 8, during a first portion of a CPU clock period, the tag clock is active (high). While the tag clock is active, the M tag memory portions 210(0) to 210(M-1) identified by the index portion of the CPU address are read to retrieve M tags. In addition, while the tag clock is active, the M tags are each compared with the tag portion of the CPU address. If one of the M tags matches the tag portion of the CPU address, the way 230 having the matching tag is identified.

During a second, subsequent, portion of the CPU clock period, the instruction clock is active (high). During the second portion of the CPU clock period, the index portion of the CPU address is used to perform a read operation on the instruction memory portion 220(x) of the identified way 230 to read an instruction therefrom. Once read, the instruction read from the instruction memory portion 220(x) of the identified way 230 is returned to the CPU 110 as the instruction requested by the CPU 110.

Timing diagram 800 schematically illustrates an embodiment of certain timing relationships for CPU clock waveform 810, NxCPU clock waveform 815, tag clock waveform 820, instruction clock waveform 830, and instruction waveform 840. Alternative timing relationships may alternatively be used. For example, the phase relationship between CPU clock waveform 810 and an of NxCPU clock waveform 815, tag clock waveform 820, and instruction clock waveform 830 may be modified. Additionally or alternatively, in some embodiments, the active states of either or both of tag clock waveform 820 and instruction clock waveform 830 are low.

COMPARATIVE EXAMPLE

FIG. 9 is a chart illustrating cache memory area and power improvement achieved using an embodiment of a cache memory using inventive aspects discussed herein as compared with a traditional cache memory. The new and old cache memories are each 8 Kbyte 4-way running a 32 MHz CPU clock. The new cache memory uses a 3× CPU clock running at 96 MHz.

As illustrated in FIG. 9, the new cache memory uses 51% less area and 72% less power.

Though the present invention is disclosed by way of specific embodiments as described above, those embodiments are not intended to limit the present invention. Based on the methods and the technical aspects disclosed herein, variations and changes may be made to the presented embodiments by those of skill in the art without departing from the spirit and the scope of the present invention.

What is claimed is:

1. A method for accessing a cache memory by a central processing unit (CPU), the method comprising:
receiving a CPU address corresponding to a request for retrieval of an instruction from cache memory, the CPU address having a tag portion and an index portion;

during a first part of a CPU clock cycle:
retrieving M tags from the cache memory, each of the M tags identifying a corresponding one of M ways of the cache memory, where M is an integer greater than one; and
comparing the M tags to the tag portion of the CPU address to determine whether there is a matching tag of the M tags that corresponds to a matching way of the M ways; and
during a second part of the CPU clock cycle, responsive to determining that there is a matching tag of the M tags, performing a read operation, based on the index portion of the CPU address, to retrieve the instruction from an instruction memory portion of the matching way of the cache memory.

2. The method of claim 1, further comprising:
indicating to the CPU, responsive to determining that there is not a matching tag of the M tags, that the instruction is not present in the cache memory.

3. The method of claim 1, wherein:
the cache memory comprises a tag memory portion having M tag memory locations in which to store the M tags; and
the retrieving comprises performing a read operation on the tag memory portion, based on the index portion of the CPU address, to retrieve the M tags.

4. The method of claim 3, wherein:
the M tag memory locations store the M tags to encode a plurality of RAM memory address ranges in which CPU instructions are stored.

5. The method of claim 4, wherein:
the tag portion of the CPU address identifies a particular RAM memory address range in which a first representation of a particular CPU instruction is stored, wherein a second representation of the particular CPU instruction is stored in the instruction memory portion; and
the comparing comprises comparing the particular RAM memory address range of the tag portion to the plurality of RAM memory address ranges encoded by the M tags.

6. The method of claim 4, wherein:
the matching tag encodes RAM information relating to the instruction; and
the performing the read operation comprises retrieving the instruction from a read instruction memory location identified by a combination of the RAM information read during the first part of the CPU clock cycle and the index portion of the CPU address.

7. The method of claim 1, wherein the comparing comprises:
providing, to each comparator of M comparators, the tag portion of the CPU address and a respective one of the M tags as inputs of the comparator, such that a respective output of each mth comparator of the M comparators indicates that an mth one of the M tags is the matching tag when the tag portion of the address matches the mth one of the M tags.

8. The method of claim 7, wherein:
each mth one of the M tags corresponds to an mth identifier of M way identifiers; and
the comparing further comprises, for each mth driver of M drivers:
providing the mth identifier to an input of the mth driver; and
gating an output of the mth driver based on the respective output of the mth comparator, such that the mth drivers passes through the mth identifier to the output as the matching way only responsive to the output of the mth comparator indicating that mth one of the M tags is the matching tag.

9. The method of claim 1, wherein:
the instruction memory portion includes M×L memory locations, wherein L is an integer corresponding to a number of instruction memory locations in each of the M ways; and
the performing the read operation comprises retrieving the instruction from one or more of the L instruction memory locations of the matching way of the M ways based on the index portion of the CPU address.

10. The method of claim 1, wherein the cache memory comprises a tag memory portion operating based on a tag clock signal, and further comprising:
detecting occurrence of the first part of the CPU clock cycle based on detecting that the tag clock signal is active, wherein the retrieving is performed responsive to the detecting.

11. The method of claim 1, wherein the instruction memory portion operates based on an instruction clock signal, and further comprising:
detecting occurrence of the second part of the CPU clock cycle based on detecting that the instruction clock signal is active, wherein the retrieving is performed responsive to the detecting.

12. The method of claim 1, further comprising:
generating a tag clock signal and an instruction clock signal based on the CPU clock cycle, such that a clock edge of the tag clock signal followed by a clock edge of the instruction clock signal occurs during each CPU clock cycle;
wherein the first part of the clock cycle corresponds to the clock edge of the tag clock signal, and the second part of the clock cycle corresponds to the clock edge of the instruction clock signal.

13. The method of claim 1, further comprising:
iterating the method for each of a plurality of periodic CPU clock cycles, the CPU clock cycle being one of the plurality of periodic CPU clock cycles.

14. Peripheral circuitry for providing access to a cache memory by a central processing unit (CPU), the peripheral circuitry comprising:
one or more CPU busses by which to receive a CPU address corresponding to a request for retrieval of an instruction from the cache memory, the CPU address having a tag portion and an index portion;
tag peripheral circuitry configured to:
detect an active tag clock signal indicating a first part of a CPU clock cycle;
retrieve, responsive to the detecting the active tag clock signal, M tags from the cache memory, each of the M tags identifying a corresponding one of M ways of the cache memory, where M is an integer greater than one; and
compare the M tags to the tag portion of the CPU address to determine whether there is a matching tag of the M tags that corresponds to a matching way of the M ways; and
instruction peripheral circuitry configured to:
detect an active instruction clock signal indicating a second part of the CPU clock cycle; and
perform, responsive to the detecting the active instruction clock signal, a read operation, based on the index portion of the CPU address, to retrieve the instruction from an instruction memory portion of the matching way of the cache memory.

15. The peripheral circuitry of claim 14, wherein:
the tag peripheral circuitry is further configured to couple with a tag memory portion of the cache memory, the tag memory portion having M tag memory locations in which to store the M tags; and
the instruction peripheral circuitry is further configured to couple with the instruction memory portion of the cache memory, the instruction memory portion logically segmented at least according to the M ways.

16. The peripheral circuitry of claim 15, wherein:
the tag peripheral circuitry comprises:
  M tag busses, M way identification busses, and an output bus;
  M comparators, each having a first comparator input coupled with one of the one or more CPU busses to receive the tag portion of the CPU address, and a second comparator input coupled with a respective one of the M tag busses; and
  M tri-state drivers, each having a first driver input coupled with a respective one of the M way identification busses, a second driver input coupled with the comparator output of a respective one of the M comparators, and a driver output coupled with the output bus;
the tag peripheral circuitry is to retrieve the M tags from the cache memory by reading the M tag memory locations of the cache memory based on the index portion of the CPU address, such that each of the M tags is represented on a respective one of the M tag busses, and data identifying each of the M ways is represented on a respective one of the M way identification busses; and
the tag peripheral circuitry is to compare the M tags to the tag portion of the CPU address by:
  generating, by each of the M comparators, a respective comparator output signal to indicate whether the respective one of the M tags represented at its second comparator input is the matching tag based on a comparison with the tag portion of the CPU address represented on its first comparator input; and
  determining, at each of the M tri-state drivers, whether to pass through the data represented on its first driver input responsive to the respective comparator output signal generated at its second driver input,
  such that the data passed through to the output bus by the M tri-state drivers identifies only the matching way as corresponding to the indicated matching tag.

17. The peripheral circuitry of claim 15, wherein:
the M tag memory locations store the M tags to encode a plurality of RAM memory address ranges in which CPU instructions are stored.

18. The peripheral circuitry of claim 17, wherein:
the tag portion of the CPU address identifies a particular RAM memory address range in which a first representation of a particular CPU instruction is stored, wherein a second representation of the particular CPU instruction is stored in the instruction memory portion; and
the tag peripheral circuitry is to compare the M tags to the tag portion of the CPU address by comparing the particular RAM memory address range of the tag portion to the plurality of RAM memory address ranges encoded by the M tags.

19. The peripheral circuitry of claim 17, wherein:
the matching tag encodes RAM information relating to the instruction; and
the instruction peripheral circuitry configured to perform the read operation by retrieving the instruction from a read instruction memory location identified by a combination of the RAM information read during the first part of the CPU clock cycle and the index portion of the CPU address.

20. The peripheral circuitry of claim 14, wherein the instruction peripheral circuitry is further configured to:
indicate to the CPU, responsive to determining that there is not a matching tag of the M tags, that the instruction is not present in the cache memory.

* * * * *